United States Patent [19]
Saiylov et al.

[11] Patent Number: 4,919,527
[45] Date of Patent: Apr. 24, 1990

[54] SOLAR RADIATION CONCENTRATOR

[76] Inventors: Nurmamed Saiylov, ulitsa Kotovskogo, 19, Korpus, 2, kv. 35; Shaakhmed A. Nazarov, ulitsa 50 let TSSR, 23a, kv. 40, both of Ashkhabad, U.S.S.R.

[21] Appl. No.: 163,976
[22] PCT Filed: Mar. 31, 1986
[86] PCT No.: PCT/SU86/00029
  § 371 Date: Nov. 19, 1987
  § 102(e) Date: Nov. 19, 1987
[87] PCT Pub. No.: WO87/06012
  PCT Pub. Date: Oct. 8, 1987
[51] Int. Cl.[5] .............................. G02B 5/08
[52] U.S. Cl. .................... 350/613; 126/438
[58] Field of Search ............... 350/613; 126/417, 438

[56] References Cited

U.S. PATENT DOCUMENTS 2,707,903 5/1955 Trombe .............................. 350/613
4,295,709 10/1981 Wood .
4,463,749 8/1984 Sobezak et al. .

OTHER PUBLICATIONS

J. E. Giutronich, "The Design of Solar Concentrators Using Toroidal Spherical or Flat Components", *Solar Energy*, 1963, pp. 162–164.
Geliotekhnika, No. 1, 1976, pp. 33–39.

*Primary Examiner*—Bruce Y. Arnold
*Assistant Examiner*—Jay Patrick Ryan
*Attorney, Agent, or Firm*—Lilling & Greenspan

[57] ABSTRACT

A solar radiation concentrator includes a supporting frame (1), facets (2) arranged thereupon in annular rows, the reflecting surface of the facets being divided into annular zones (3). At least one of the peripheral annular zones (3) has a toroidal surface whose generatrix (4) is an arc. The center (5) of curvature of the generatrix (4) lies to the other side from the concentrator optical axis (6) relative to the generatrix. The geometric parameters of the annular zone (3) having a toroidal surface are chosen in such a way that of all the beams falling thereupon parallel to the optical axis (6) of the concentrator two beams (7, 8) are focused to the projected focus (F).

1 Claim, 4 Drawing Sheets

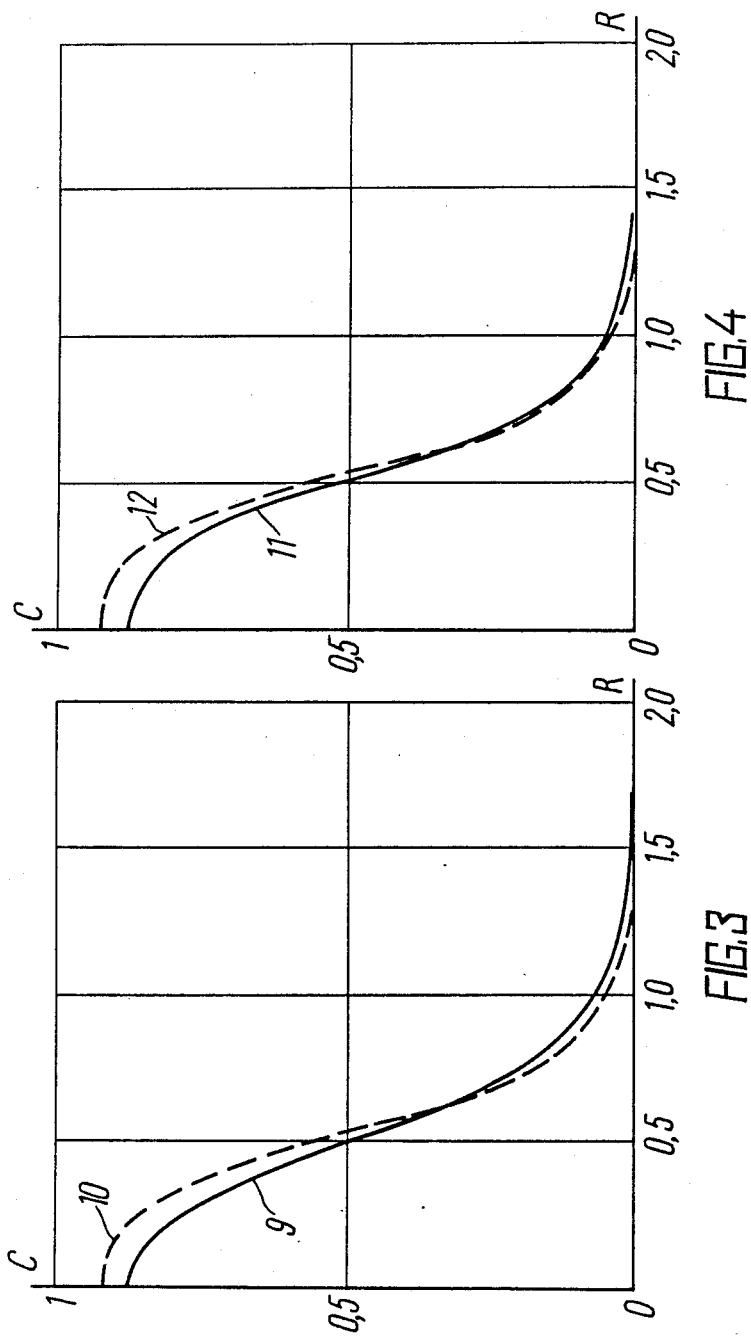

SOLAR RADIATION CONCENTRATOR

BACKGROUND OF THE INVENTION

1. Field of the Invention

The present invention relates to solar energy technology and, more particularly, to solar radiation concentrators.

2. Description of the Prior Art

Solar energy technology concentrators of over two meters in diameter are made composite due to technological difficulties in approximating the rated paraboloidal or other surface with individual mirors-facets having different geometry than the reflecting surface.

Known in the art is a solar radiation concentrator (U.S. Pat. No. 4,295,709, U.S. Class 350-292), which includes a supporting frame made in the form of a paraboloid of revolution which by the accuracy of manufacture approximates to the maximum extent the rated surface on which flat mirrors are secured whose surface approximates the paraboloidal surface. With such an approximation of the paraboloidal surface the number N facets is of the same order as the coefficient C of concentration in the focal point. However, the manufacture of a true paraboloidal supporting frame and the assembly of a large quantity of facets thereupon are labour-consuming and entail sizable manufacturing costs despite apparent simplicity.

Also known in the art is a solar radiation concentrator (French Application No. 2477725, IPC³ G 02 B 5/10, 1981), which inclues a supporting frame with facets mounted thereupon which have a spherical reflecting surface with equal radii of curvature in every annular zone. The supporting frame is made in the form of annular zones displaced relative to the apex so as to make it possible to adjust the position of the focal image of a radiation source from all annular zones in the focal plane of the concentrator, diminishing the impact of spherical aberration of the reflected beams on the degree of energy concentration in the focal spot. However, with this arrangement of facets on the supporting frame, it is impossible to eliminate the impact of angular aberrations caused by a large angle of incidence between the normal to the facet and the incident beams parallel to the concentrator optical axis which decreases the degree of energy concentration in the focal spot. To attain the degree of concentration approximating that of an equivalent paraboloidal concentrator, there arises a necessity of reducing the radial size of facets and their number in annular zones.

Also known in the art is a solar radiation concentrator (cf. "Geliotekhnika", No. 1, 1976, pp. 33-39, FIGS. 1 and 2 on page 34) whose reflecting surface is composed of spherical annular zones arranged on the supporting frame, whose radii of curvature are optimized versus the angular coordinates of the centres of zones on the supporting frame with a view to attaining the maximum concentration. And radii R of curvature of the spherical facets in the zones satisfy the condition $R_s < R < R_m$, where $R_m$ and $R_s$ are meridional and tangential radii of curvature of the rated paraboloidal surface, respectively, in the point of tangency of the apex of the spherical facets.

With such an optical diagram of the concentrator one may achieve concentrations corresponding to that attained by the paraboloid of revolution, whose optical accuracy δ (in angular minutes) of fabrication is equivalent to the optical accuracy δ of the concentrator with spherical annular zones. However, a great number of spherical annular zones with different types of radii R of curvature and a large quantity of facets of the same type in the zone are needed to achieve the said concentration which increases the concentrator cost.

Also known in the art is an optical diagram of the concentrator (cf. the journal 'Solar Energy', No. 4, 1963, pp. 162-164, FIG. 1), whose reflecting surface is composed of toroidal facets arranged in annular rows on the paraboloidal supporting frame. The toroidal zone is obtained by turning the arc with a radius R equal to the meridional radius $R_m$ of curvature in the point of tangency of the arc with the rated generatrix of the paraboloid of revolution, the centres of toroidal zones lying in the same point of the generatrix of the paraboloid surface which is approximated by the said toroidal facets. In this case, of all the incident beams parallel to the optical axis of the concentrator it is only one beam falling on the point of tangency of the arc with the rated generatrix of the paraboloid that is reflected to the projected focus. Such a synthesis of the concentrator reflecting surface enables one to reduce the quantity of toroidal annular zones and increase the degree of concentration by regulating the orientation of individual facets on the paraboloidal supporting frame. However, the toroidal zones, obtained through this method and arranged with the centres on the generatrix of the rated parabola with the regulation of the facet orientation in annular zones, bring about errors both in the radial and tangential sections decreasing the maximum attainable degree C of concentration in the concentrator focal spot.

Besides, the regulation of the facet orientation in the paraboloidal supporting frame gives rise to aperture breaks in the radial section, and in the tangential section leads to fractures in the reflecting surface of the annular zones. Thus, the solar radiation falling on the concentrator is not fully utilized.

SUMMARY OF THE INVENTION

The main object of the present invention is to provide a solar radiation concentrator, wherein the arrangement of facets on the supporting frame along a definite surface makes it possible to simplify the technology of manufacturing the concentrator and raise the degree of radiation concentration in the focal spot with the minimal quantity of facets comprising the concentrator, and use the radiation falling on the concentrator without losses.

This object is accomplished by a solar radiation cocentrator incorporating a supporting frame and facets arranged thereupon in annular rows and whose reflecting surface is divided into annular zones. According to the invention, at least one of the peripheral annular zones of the reflecting surface of the facets has a toroidal surface whose generatrix is an arc, the centre of curvature of which lies relative to said generatrix to the other side from the concentrator optical axis, the geometric parameters of the annular zone having a toroidal surface are chosen in such a way that of all the beams falling on said zone parallel to the concentrator optical axis two beams are focused into the projected focus.

The herein disclosed invention makes it possible to reduce the number of annular zones in the concentrator having different type facets as well as to decrease the latter's quantity in the concentrator annular zones upon the attainment of the radiation flow density differing by a more 3 to 5 percent of the flow density in the focal spot of an equivalent paraboloidal concentrator. The quantity of facets in the annular zones is determined proceeding from the conveniency of transportation, assembly and adjustment thereof on the supporting frame, and for small diameter concentrators the annular zones may be fabricated solid or one-piece.

BRIEF DESCRIPTION OF THE DRAWINGS

The invention will be more apparent upon considering the following detailed description of exemplary embodiments thereof, reference being made to the accompanying drawings wherein:

FIG. 3 is the distribution of the radiation concentration degree in the focal spot for a concentrator with three annular zones having a toroidal surface;

FIG. 4 is the distribution of the radiation concentration degree in the focal spot for a concentrator with four annular zones having a toroidal surface.

DESCRIPTION OF THE PREFERRED EMBODIMENT

Figure 1:
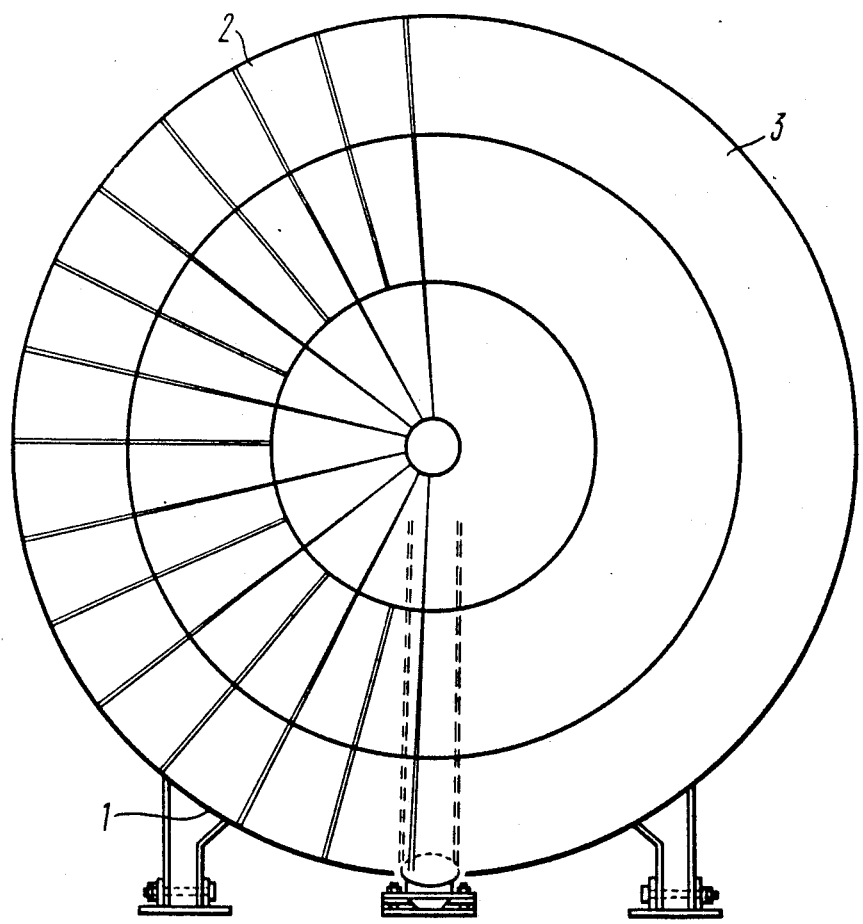
FIGS. 1 and 1A are general views of the solar radiation concentrator, according to the invention.

The herein disclosed solar radiation concentrator a supporting frame 1 (FIGS. 1 and 1A) and facets 2 arranged thereupon in annular rows. The reflecting surface of the facets 2 is divided into annular zones 3 of which the central ones have a spherical surface and at least one of the peripheral zones 3 has a toroidal surface. These zones may be formed with the aid of the facets 2 having spherical or toroidal geometry of their reflecting surfaces. It is preferable that the zones 3 be made from the facets 2 having a torodial geometry of the reflecting surface, because in this case the number of facets 2 is determined proceeding from technological and structural considerations. As the zones 3 having a toroidal surface are made up from the spherical facets 2, the latter's number in the zones is increased roughly by one order since it is necessary to ensure a desired accuracy of the toroidal zone 3 in the tangential section.

A generatrix 4 (FIG. 2) of the toroidal surface in the annular zones 3 is an arc whose center 5 of curvature lies to the other side of the concentrator relative to the optical axis 6. The geometric parameters of the annular zone 3 with a toroidal surface are chosen in such a way that of all the beams falling parallel to the concentrator optical axis 6 two beams 7 and 8 falling into points $l_1$ and $l_2$ are focused to the projected focus or focal point F.

The geometric parameters of the annular zones 3 having a toroidal surface and ensuring the reflection of the beams 7 and 8 to the projected focal point F are calculated by the following formulae:

$$W_H = W_b - \qquad (1)$$

$$\left( K + \frac{1 + T^2}{4T} K^2 + \frac{15 - 7T^2 + 3T^4}{96T^2} K^3 + \frac{(1 + T^2)(12 - 17T^2)}{96T^3} K^4 \right).$$

Figure 1A:
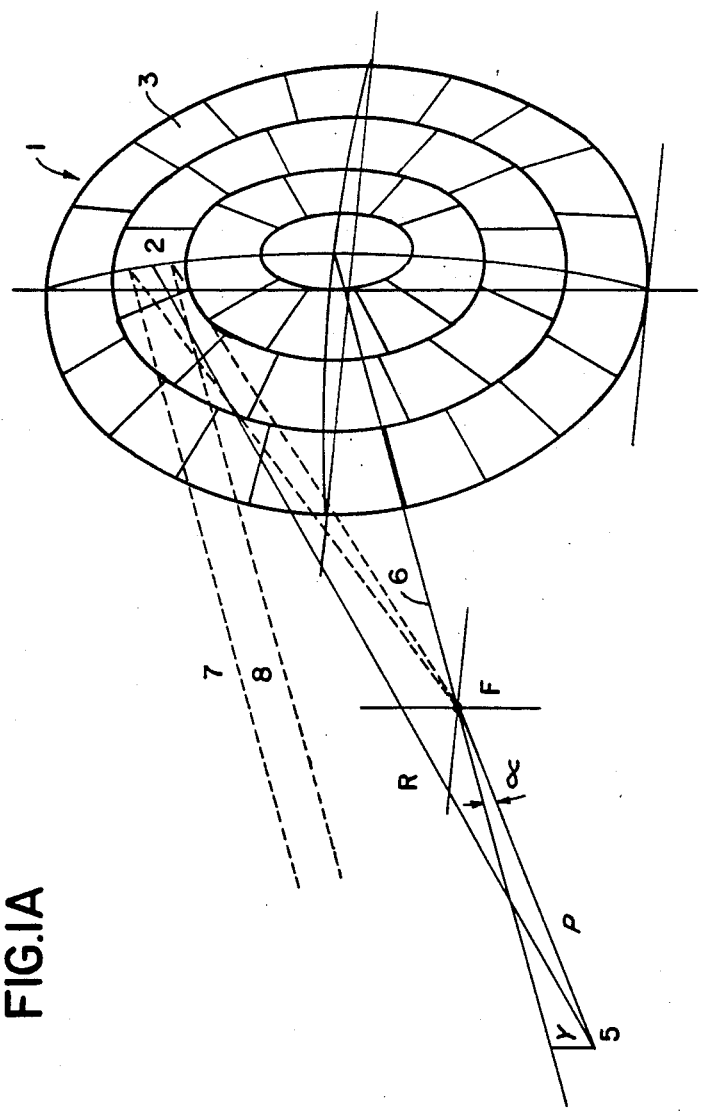

-continued $$K = \sqrt{\frac{8}{3} \frac{|\psi|}{T}} \; ; \; T = \tan(W_b - |\psi|), \qquad (2)$$

where
$|\psi|$ is an allowance for the deviation of a reflected beam from the projected position of the concentrator focus;
$W_b$ is an angular position of the upper boundary of the peripheral annular zone 3 (FIG. 1);
$W_H$ is an angular position of the lower boundary of the periheral annular zone 3.

The angular position $W_b$ of the upper boundary of the external peripheral annular zone 3 in the concentrator being read off from center 5 (FIG. 2) of curvature is found from the formula:

$$W_b = \frac{U_m + |\psi|}{2}, \qquad (3)$$

where $U_m$ is a concentrator aperture.

The angular position of the upper boundary of the subsequent peripheral annular zone 3 corresponds to the angular position of the lower boundary of the external peripheral annular zone 3.

The center 5 of curvature of the generatrix 4 is displaced from the optical axis 6 of the concentrator to a distance found with the aid of the formula:

$$y = \rho \cdot \sin \alpha \qquad (4)$$

where
$\rho$ is the distance from the center 5 of curvature of the generatrix 4 to the focus F of the concentrator;
$\alpha$ is the angle between the optical axis 6 of the concentrator and the line connecting the focus F thereof with the center 5 of curvature of the generatrix 4.

Given the prescribed values of the diameter $D_k$ of the concentrator, its aperture $U_m$ and allowance $|\psi|$ for the deviation of a reflected beam from the projected focus F, all the said parameters of the displacement of the radius of curvature in the generatrix 4 are determined by the formulae:

$$\tan \alpha = \frac{(1 + 2\cos\Delta)\sin W_c - \sin 3 W_c + 2|\psi|\cos 3 W_c}{(1 + 2\cos\Delta)\cos W_c - \cos 3 W_c - 2|\psi|\sin 3 W_c} \qquad (5)$$

$$M = \frac{\sqrt{\cos^2\Delta + (1 + 2\cos\Delta)(\sin^2 W_c - |\psi| 2 W_c)}}{2 \cos \Delta \cos \frac{\Delta}{2}} \qquad (6)$$

$$R = \frac{r_b}{\sin W_b - M \sin \alpha} \; ; \; \Delta = W_b + W_h \qquad (7)$$

$$W_c = \frac{W_b - W_H}{2} \; ; \; r_b = \frac{D_k}{2} \qquad (8)$$

where
$D_k$ is a concentrator diameter;
R is a radius of curvature of the generatrix 4 in the external peripheral annular zone 3 (FIG. 1).

A new value $r_b$ and R is calculated for the subsequent (inner) peripheral annular zones 3 with due account of the value of the annular positions of the boundaries of rows. The found value R corresponds to the radius $R_m$ of curvature in a radial section.

The radius $R_s$ of curvature in the tangential section is determined by the formula:

$$R_s = R\left(1 - M\frac{\sin\alpha}{\sin w_{ox}}\right) \quad (9)$$

where

W is the angle between the optical axis 6 and the radius of curvature R and equal to the angle of incidence (reflection) of solar beams;

where m is the ratio of $\rho$ to R.

Given as an example are the calculations of the geometric parameters of the annular zones 3 (variant A) with $D_k=2.6$ m; $U_m=60°$ and $|\psi|=8'$ and the concentrator (variant B) with $D_k=2$ m; $U_m=60°$ and $|\psi|=16'$.

| Zone No. | Variant A | | | | Variant B | | | |
|---|---|---|---|---|---|---|---|---|
| | R mm | Y mm | $r_b$ mm | $R_H$ mm | R mm | Y mm | $r_b$ mm | $r_H$ mm |
| I | 3181,9 | 290,9 | 1300 | 985,8 | 2368,0 | 184,0 | 1000 | 654,6 |
| II | 2721,7 | 106,3 | 983 | 651,5 | 1930,3 | 29,0 | 651 | 251,6 |
| III | 2398,8 | 16,4 | 649 | 239,2 | 1730,4 | 0 | 245 | 0 |
| IY | 2245,0 | 0 | 235 | 0 | — | — | — | — |

Radius $r_b$ of the upper boundary of the external peripheral annular zone 3 is equal to half the diameter of the concentrator $D_k$.

Radius $r_H$ of the lower boundary of the external peripheral annular zone 3 is the projection $W_H$ to a midsection.

In FIG. 3 the curve 9 shows the distribution of the radiation concentration degree in the focal spot for a concentrator with three annular zones 3 (FIG. 1), having a toroidal surface, with aperture $U_m=60°$, with the allowance $|\psi|=8'$, and a curve 10 (FIG. 3)—the same for integral paraboloidal concentrator with the aperture $U_m=60°$ with an equivalent manufacture angle error.

In FIG. 4 a curve 11 shows the distribution of the radiation concentration degree for a concentrator with four annular zones 3 (FIG. 1) having a toroidal surface, with the aperture $U_m=60°$ with the allowance $|\psi|=4'$, and a curve 12 (FIG. 4)—the same integral paraboloidal concentrator with the aperture $U_m=60°$ with an equivalent manufacture angle error. Taken as a unit is the coefficient of concentration of the ideal paraboloidal concentrator with the aperture $U_m=60°$.

Figure 2:
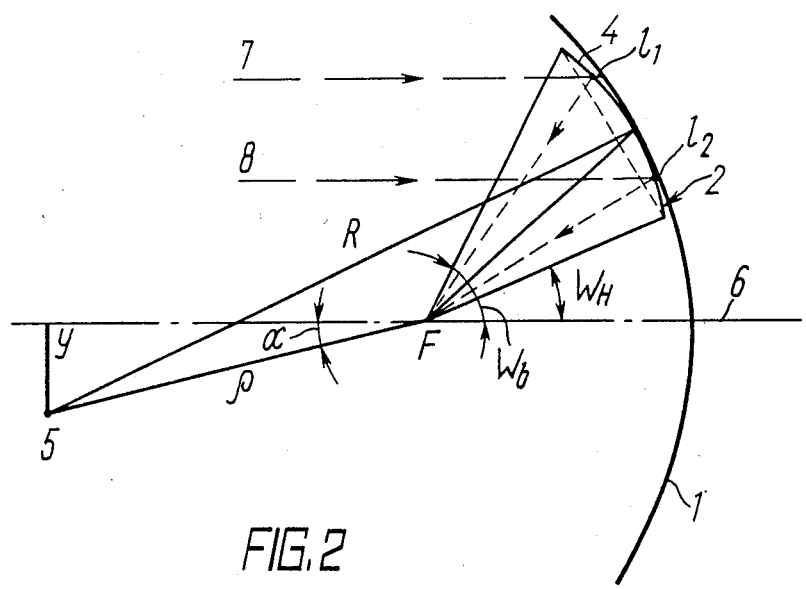
FIG. 2 is an optical diagram of the solar radiation concentrator shown in FIG. 1.

Solar radiation falling on the concentrator is reflected by its central annular zones 3 (FIG. 1), having a spherical surface, to the focus F (FIG. 2). The peripheral zones 3 (FIG. 1) of the concentrator, which have a toroidal surface, ensure the reflection of radiation to the focal spot. Meanwhile, the prescribed degree of radiation concentration is provided by the fact that the geometric parameters of these annular zones 3 are calculated with the aid of the aforementioned formulae to ensure the reflection of beams 7 and 8 (FIG. 2) to the focus F.

The foregoing graphs of energy distribution in the focal spots of the equivalent solid paraboloidal concentrator and the herein-disclosed concentrator with toroidal zones 3 (FIG. 1) illustrate the possibility of attaining the maximum density of the flow with the minimal quantities of different types of the facets 2 in the zones 3.

The invention may be utilized as part of sun furnaces and solar energy plants.

We claim:

1. A solar radiation concentrator comprising a supporting frame (1) and facets (2) having a toroidal reflecting surface and arranged in annular zones (3), the reflecting surfaces of the toroidal annular zones (3) being formed by turning arcs of a circle 4 about an optical axis (6) of the concentrator upon rotation of the arc of the circle (4) by an angle $0.5|\psi|$ in a meridian plane, the geometrical coordinates of the center of a curvature (5) of the said circle (4) arc being determined in space by the parameters $\alpha$, $\rho$ which are calculated by the formulae $$\tan\alpha = \frac{(1 + 2\cos\Delta)\sin W_c - \sin 3W_c + 2|\psi|\cos 3W_c}{(1 + 2\cos\Delta)\cos W_c - \cos 3W_c - 2|\psi|\sin 3W_c}$$

$$\rho = M \cdot R$$

wherein:

$$M = \frac{\sqrt{\cos^2\Delta + (1 + 2\cos\Delta)(\sin^2 W_c - |\psi|2W_c}}{2\cos\Delta\cos\frac{\Delta}{2}}$$

and wherein the parameters of the toroidal annular zones 3 $W_b$, $W_h$, R, $\Delta$ are calculated by the formulae $$W_b = \frac{U_m + |\psi|}{2}$$

$$W_H = W_b - \left\{K + \frac{1 + T^2}{4T}K^2 + \frac{15 - 7T^2 + 3T^4}{96T^2} \cdot K^3 + \frac{(1 + T^2)(12 - 17T^2)}{96T^3} \cdot K^4\right\}$$

wherein:

$$T = \tan(W_b - |\psi|); \quad K^2 = \frac{8|\psi|}{3T}$$

$$\Delta = W_b - W_H; \quad R = \frac{r_b}{\sin W_b - M\sin\alpha}; \quad r_b = \frac{D_k}{2}$$

ensure the focusing of two beams (7, 8) from the center of the solar disk to the projected focus F and the rest of beams—below and above the projected focus F—within the limits of allowance $|\psi|$, wherein, the parameters $\rho$, $\alpha$, R, Y, $W_h$, $W_b$, K, T, $r_b$ $\Delta$, and M stand for:

$\rho$ is the distance from the focus F of the concentrator to the center of curvature 5 of the circle 4 arc;

R is the radius of curvature of the facet in the meridian plane;

M is the value of $\rho/R$;

Y is the distance from the optical axis 6 to the center of curvature 5 of the circle 4 arc;

$\alpha$ is the angle between the optical axis of the concentrator and $\rho$;

$W_h$, $W_b$ are respectively the lower and upper boundaries of the annular zones 3;

K is a coefficient $$\frac{8|\psi|}{3T};$$

T is the parameter $T = \tan(W_b - |\psi|)$;

Δ is the difference of $W_b$ and $W_h$;

$D_k$ is diameter of concentrator, whereby a maximum concentration in the focus of the concentrator is obtained with the maximum width of the annular zones (3).

* * * * *